E. B. CAMPBELL.
PACKING RING.
APPLICATION FILED JULY 6, 1914.
1,120,022.
Patented Dec. 8, 1914.
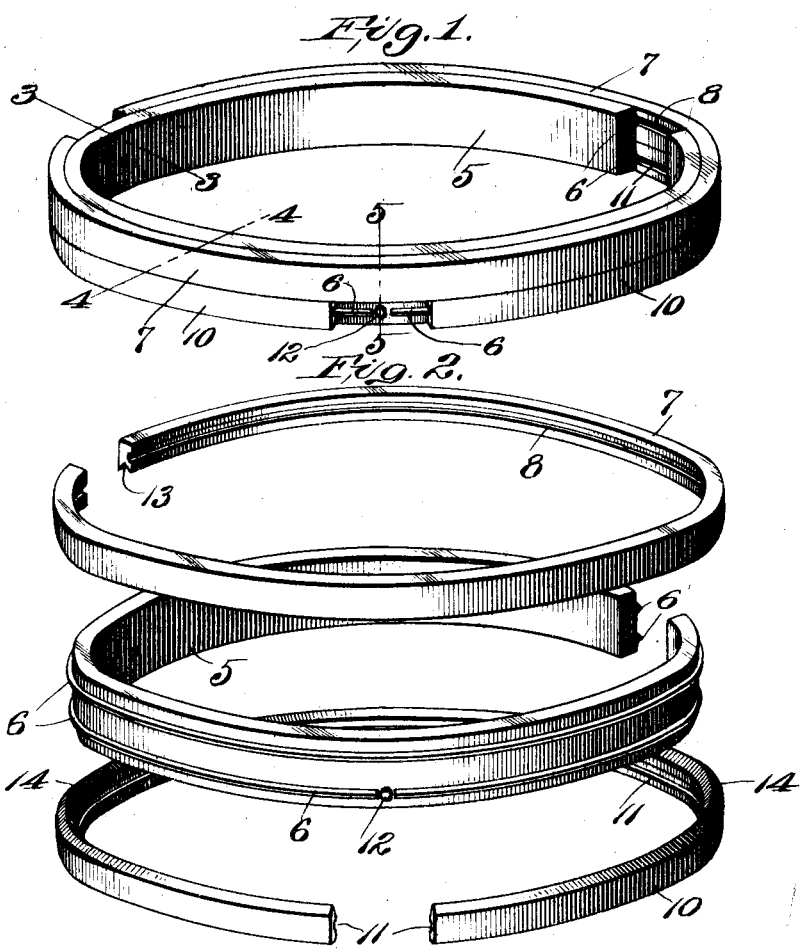
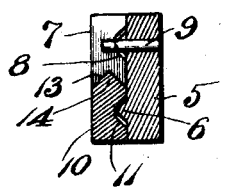
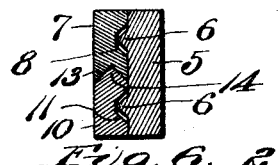
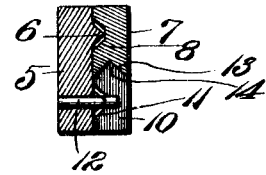
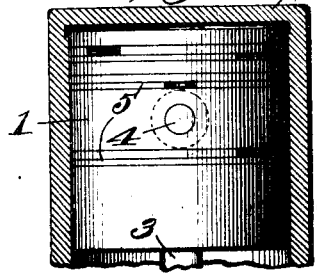
Attest:
Wm H Scott
N. G. Butter
Inventor:
Edward B. Campbell,
by Rippey Kingsland,
Attys

UNITED STATES PATENT OFFICE.

EDWARD B. CAMPBELL, OF ST. LOUIS, MISSOURI, ASSIGNOR TO STA-TITE PACKING RING COMPANY, OF ST. LOUIS, MISSOURI, A CORPORATION OF MISSOURI.

PACKING-RING.

1,120,022.      Specification of Letters Patent.      Patented Dec. 8, 1914.

Application filed July 6, 1914. Serial No. 849,33

*To all whom it may concern:*

Be it known that I, EDWARD B. CAMPBELL, a citizen of the United States, residing in the city of St. Louis and State of Missouri, have invented a new and useful Packing-Ring, of which the following is a specification.

This invention relates to packing rings for reciprocating pistons and it consists of a resilient inner ring and a number of resilient outer rings encircling said inner ring, with novel means for retaining and holding said rings in their proper relative adjustments.

An object of the invention is to provide an improved packing ring consisting essentially of a number of metallic rings having a relative resilient action, in combination with novel and improved interlocking structure in connection with said rings for holding them in proper relative adjustments, but permitting the necessary independent action so that when assembled in position upon the piston they will impart the desired uniform pressure against the inner surface of the cylinder throughout their circumference, even though the cylinder becomes worn so that it is not a true or exact circle.

Another object is to provide an improved packing ring comprising a number of resilient outer rings of the open type capable of expansion to compensate for the wear of the cylinder and to exert a uniform pressure against the inner surface of the cylinder throughout their circumference, means for preventing the expansion or extension of the ends of the outer rings so that they cannot become fouled, or engaged in any of the ports into or from the cylinder, in combination with an inner ring of the resilient type compressed so that the outer rings will encircle and be expanded thereby to impart uniform pressure against the surface of the cylinder, in combination with means limiting relative movement of all of said rings with respect to each other.

Other objects to be accomplished by this invention and many advantages thereof will be apparent to those skilled in the art to which the invention relates without specific mention, and it will be understood therefore that in mentioning a few of the objects and advantages of the invention, I do not deprive myself of any of the uses or advantages thereof, because not mentioning all of such advantages or uses.

In the accompanying drawings, wherein I have illustrated a preferred embodiment of the invention, Figure 1 is a perspective view of the assembled piston ring in which the outer rings are mounted upon and encircle the inner ring. Fig. 2 is a perspective view of the two outer rings and the inner ring, before being assembled. Fig. 3 is a cross sectional view on the line 3—3 of Fig. 1. Fig. 4 is a cross sectional view on a line such as 4—4 of Fig. 1. Fig. 5 is a sectional view on the line 5—5 of Fig. 1. Fig. 6 is a sectional view of a cylinder illustrating a piston equipped with my improved packing rings mounted therein.

The piston 1 is of the usual reciprocating type mounted within a cylinder 2. A piston rod 3 pivoted to the piston at 4 transmits the power of the piston to the driven mechanism.

The packing ring constituting the present invention is adapted to be mounted in a circumferential groove in the piston and to reciprocate therewith. It is usual to equip each piston with a number of packing rings for purposes of efficiency and, in Fig. 6, I have illustrated the piston equipped with three packing rings.

Each packing is composed of a number of rings coöperatively related and adapted to be mounted in the same circumferential groove on the piston so that the resiliency of the rings will be exerted upon the interior surface of the cylinder. Each packing includes an inner ring 5 of the open type originally cut from a cylinder somewhat larger than the diameter of the ring when it has finally been seated in the groove on the piston and within the cylinder. In the embodiment illustrated the ring 5 is formed with two circumferential ribs or flanges 6. The ribs or flanges 6 are substantially parallel and are at substantially equal distances from the side edges of the ring, so that there is a space between each rib or flange and the adjacent edge of the ring. The packing ring also includes two outer rings which encircle the ring 5 and are expanded by the resiliency of said ring 5 as well as by their own resiliency. Both of said rings are, preferably, originally cut from a cylinder whose external diameter is slightly in excess of the internal diameter of the cylinder in which they are to operate so that, when said rings are compressed into the piston cylinder, there will be a resilient pressure exerted by said rings upon the interior surface of the piston cylinder.

The outer ring 7 is of the open type and when mounted on the ring 5 is so located that its ends are distant from the ends of said ring 5. The ring 7 is provided with an internal channel or groove 8 adapted to receive one of the ribs or flanges 6 and thereby be retained or held in position upon the ring 5. When so mounted the outer edge of the ring 7 is flush with one edge of the ring 5 and is held from lateral displacement by the interlocking connection comprising the rib or flange 6 and the groove 8, as above described.

In order to prevent excessive movement of the ring 7 with respect to the ring 5, the latter is provided with an abutment 9 in the form of a pin extending into the space between the ends of the ring 7.

The coöperating outer ring 10 is provided with an internal groove or channel 11 which receives the other one of the two ribs 6 when the ring 10 is mounted on the ring 5 to complete the packing. Movement of the ring 10 with respect to the rings 5 and 7 is limited by an abutment 12 on said ring 5. The edge of the ring 7 which is adjacent to the ring 10 is formed with a groove 13 and the adjacent edge of the ring 10 is formed with a projection 14 seated in said groove 13. Thus the two rings 7 and 10 are interlocked with the inner ring 5 by the ribs or flanges 6 and by the abutments 9 and 12, the said two rings being interlocked with each other by the tongue and groove connection 13—14.

By reference to Figs. 3 and 4 it will be observed that the groove 8 in the ring 7 and the groove 11 in the ring 10 are somewhat wider than the flanges or ribs 6 which extend into said grooves. This construction enables a lubricant to pass into the grooves 8 and 11 as passages so as to keep the adjacent surfaces of all of the rings thoroughly lubricated, and thus maintaining free movement and action thereof with respect to each other. It will be understood that because the open ends of the rings 7 and 10 are remote from each other the two rings expand somewhat in different planes or in different directions, that is to say, eccentrically with respect to each other. This difference in expansion results in a camming action of the walls of the groove 13 against the projection 14, thereby pressing the two outer rings away from each other and toward the opposite walls of the groove around the piston in which the rings are seated. This variation or slight movement by the rings 7 and 10 is automatic, and the necessary compression and expansion of said rings under varying degrees of temperature at all times maintains a close connection with the piston, it being understood that the rings 7 and 10 are enabled to move laterally slightly with respect to the inner ring 5 because of the fact that the grooves 8 and 11 are wider than the ribs 6.

The connection 13—14 prevents undue outward movement or expansion by the ends of the rings 7 and 10 so that, when the piston is operating, the ends of the outer rings cannot become engaged in any of the port openings which would result in fouling the rings. By this construction the ends of each of the two rings are held flush with the adjacent surface of the other ring which, obviously, will move freely and without obstruction across any of the ports leading into or from the cylinder.

It will be understood that there may be various modifications in the construction and arrangement of the different rings and that said rings may be interlocked in other ways than in the embodiment described. Therefore, I do not restrict myself to specific features, but

What I claim and desire to secure by Letters Patent is:—

1. In a packing, the combination of a resilient open inner ring, two flanges integral with the periphery of said inner ring, two resilient open outer rings encircling said inner ring and having grooves in their inner surfaces which are wider than said flanges and which receive said flanges, substantially as and for the purpose described.

2. A packing for pistons, comprising a resilient open inner ring, a plurality of flanges encircling said ring, a number of resilient open outer rings encircling and expanded by the pressure of said inner ring and having grooves in their inner surfaces which are wider than and which receive said flanges whereby said outer rings are enabled to move laterally with respect to said inner ring, and means for preventing the fouling of the ends of said outer rings with the cylinder ports and for actuating said outer rings apart, substantially as described.

3. The combination with a cylinder, and a piston arranged to reciprocate in said cylinder and provided with a circumferential groove, of a resilient open inner ring seated in said groove, a resilient open outer ring encircling and expanded by the pressure of said inner ring and having a V-shaped groove in its inner edge, a second resilient open outer ring encircling and expanded by the pressure of said inner ring, a V-shaped projection on the inner edge of said second ring seated in said groove in said first-named outer ring whereby said two outer rings are actuated apart as an incident to their expansion by said inner ring, said groove and said projection also preventing fouling of the ends of said outer rings with the ports of the cylinder, and means carried by said inner ring for limiting movement of said outer rings; substantially as described.

4. A packing for pistons, comprising a resilient open inner ring, a number of resilient outer rings encircling and expanded by the pressure of said inner ring and having passages in their inner surfaces arranged to conduct lubricant between said outer and inner rings, and engaging inclined walls on the adjacent edges of said outer rings effective to prevent fouling of the ends of said outer rings with the cylinder ports and to actuate said outer rings apart as an incident to their expansion, substantially as described.

5. The combination with a cylinder, and a piston arranged to reciprocate in said cylinder and provided with a circumferential groove, of a resilient open inner ring, a plurality of flanges encircling said ring, a number of resilient open outer rings encircling and expanded by the pressure of said inner ring and having grooves in their inner surfaces which are wider than and which receive said flanges, means limiting movement of said outer rings with respect to said inner ring, and means actuating said outer rings apart as an incident to their expansion, said means also preventing fouling of the ends of said rings with the ports of the cylinder, substantially as described.

In witness whereof, I have signed this specification in the presence of two subscribing witnesses.

EDWARD B. CAMPBELL.

Witnesses:
L. C. KINGSLAND,
K. R. McDONALD.